United States Patent
Daijavad et al.

(10) Patent No.: US 10,085,157 B2
(45) Date of Patent: Sep. 25, 2018

(54) RECONFIGURING A MOBILE NETWORK BASED ON CELLULAR NETWORK STATE INFORMATION

(71) Applicant: International Business Machines Corporation, Armonk, NY (US)

(72) Inventors: Shahrokh Daijavad, Morgan Hill, CA (US); Bijan Davari, Mahopac, NY (US); Brian P. Naughton, Reading (GB); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 14/743,281

(22) Filed: Jun. 18, 2015

(65) Prior Publication Data
US 2016/0373941 A1    Dec. 22, 2016

(51) Int. Cl.
| | |
|---|---|
| *H04W 24/02* | (2009.01) |
| *H04L 12/26* | (2006.01) |
| *H04L 12/24* | (2006.01) |
| *H04W 84/04* | (2009.01) |

(52) U.S. Cl.
CPC ......... *H04W 24/02* (2013.01); *H04L 41/0823* (2013.01); *H04L 41/0893* (2013.01); *H04L 41/142* (2013.01); *H04L 41/5025* (2013.01); *H04L 43/08* (2013.01); *H04W 84/042* (2013.01)

(58) Field of Classification Search
CPC .................................................. H04W 24/02
See application file for complete search history.

(56) References Cited

U.S. PATENT DOCUMENTS

| | | |
|---|---|---|
| 5,461,699 A | 10/1995 | Arbabi et al. |
| 6,904,055 B2 | 6/2005 | Pichna et al. |
| 7,263,351 B2 | 8/2007 | Ross et al. |
| 7,397,770 B2 | 7/2008 | Le et al. |
| 7,478,407 B2 | 1/2009 | Jain et al. |
| 7,599,384 B2 | 10/2009 | Vialen et al. |
| 8,935,368 B2 | 1/2015 | Calo et al. |

(Continued)

OTHER PUBLICATIONS

IBM Software Data Sheet "IBM Tivoli Netcool Performance Manager—Performance management for wireless, wireline and convergent networks," pp. 1-6 (Jun. 2010).

(Continued)

*Primary Examiner* — Jason E Mattis
(74) *Attorney, Agent, or Firm* — Jennifer R. Davis; Michael J. Chang, LLC

(57) ABSTRACT

Techniques for reconfiguring mobile networks based on network state information are provided. In one aspect, a method for managing a mobile network is provided. The method includes the steps of: gathering network state information from an edge of the mobile network, wherein the edge of the mobile network includes a radio network and a cellular network through which user equipment communicate with an internet protocol (IP) network which is at a core of the mobile network; analyzing the network state information based on policy controls to determine actions for optimizing the mobile network; and reconfiguring the mobile network using the actions for optimizing the mobile network. A system for managing a mobile network is also provided.

19 Claims, 4 Drawing Sheets

(56) References Cited

U.S. PATENT DOCUMENTS

| | | | |
|---|---|---|---|
| 9,204,329 B2* | 12/2015 | Boyle | H04W 24/10 |
| 2006/0270400 A1 | 11/2006 | Dasilva et al. | |
| 2008/0080544 A1 | 4/2008 | Mani et al. | |
| 2011/0116443 A1 | 5/2011 | Yu et al. | |
| 2012/0269061 A1* | 10/2012 | Kekki | H04W 28/24 |
| | | | 370/230 |
| 2013/0250969 A1 | 9/2013 | Hui et al. | |
| 2014/0026169 A1* | 1/2014 | Ye | H04L 47/35 |
| | | | 725/62 |
| 2014/0045475 A1 | 2/2014 | Anthony, Jr. et al. | |
| 2015/0031360 A1* | 1/2015 | Choi | H04W 36/22 |
| | | | 455/436 |

OTHER PUBLICATIONS

Liu et al., "Transmission Scheduling for Efficient Wireless Utilization," INFOCOM 2001, Twentieth Annual Joint Conference of the IEEE Computer and Communications Societies. Proceedings. IEEE (vol. 2, pp. 776-785) (Apr. 2001).

Tsibonis et al., "Exploiting Wireless Channel State Information for Throughput Maximization," IEEE Transactions on Information Theory, vol. 50, issue 11, pp. 2566-2582 (Oct. 2004).

X. Lin et al., "A Tutorial on Cross-Layer Optimization in Wireless Networks." IEEE Journal on Selected Areas in Communications, vol. 24, No. 8, pp. 1452-1463 (Aug. 2006).

Ng et al., "Joint Optimization of Relay Strategies and Resource Allocations in Cooperative Cellular Networks," IEEE Journal on Selected Areas in Communications, vol. 25, No. 2, pp. 328-339 (Feb. 2007).

* cited by examiner

RECONFIGURING A MOBILE NETWORK BASED ON CELLULAR NETWORK STATE INFORMATION

FIELD OF THE INVENTION

The present invention relates to techniques for managing mobile networks, and more particularly, techniques for reconfiguring mobile networks based on network state information so as to optimize the network.

BACKGROUND OF THE INVENTION

Mobile network operators operate and try to optimize their networks on the basis of the current network state. This network optimization is often done at the core of a mobile network from a centralized location. Information that is available at the edges of the network, such as the radio spectrum available at a location, is not used in network optimization because it is difficult to collect, and the embedded information is oftentimes lost by the time the network controller receives it.

Therefore, current network optimization and reconfiguration techniques do not take edge capacity of radio networks into account. This severely limits the possible optimizations that can be implemented since the radio network is the most congested network in current environments, and likely to remain so for the long term due to limited spectrum.

Thus, network optimization solutions which can take into account information collected at the edge of the network would be desirable.

SUMMARY OF THE INVENTION

The present invention provides techniques for reconfiguring mobile networks based on network state information so as to optimize the network. In one aspect of the invention, a method for managing a mobile network is provided. The method includes the steps of: gathering network state information from an edge of the mobile network, wherein the edge of the mobile network includes a radio network and a cellular network through which user equipment communicate with an internet protocol (IP) network which is at a core of the mobile network; analyzing the network state information based on policy controls to determine actions for optimizing the mobile network; and reconfiguring the mobile network using the actions for optimizing the mobile network.

In one aspect of the invention, a system for managing a mobile network is provided. The system includes one or more monitoring servers for gathering network state information from one or more application servers located at an edge of the mobile network, wherein the edge of the mobile network includes a radio network and a cellular network through which user equipment communicate with an IP network which is at a core of the mobile network; one or more policy control servers for analyzing the network state information based on policy controls to determine actions for optimizing the mobile network; and one or more configuration servers for reconfiguring the mobile network using the actions for optimizing the mobile network.

A more complete understanding of the present invention, as well as further features and advantages of the present invention, will be obtained by reference to the following detailed description and drawings.

DETAILED DESCRIPTION OF PREFERRED EMBODIMENTS

Provided herein are network optimization techniques where distributed information collected at the edge of the network is used to make a better assessment of the current network state which allows the core network to better adapt to changing network conditions. Thus, in contrast to conventional network optimization procedures, the present techniques enable taking the edge capacity of radio networks into account when making optimization decisions.

As will be described in detail below, the present techniques make use of an application server or a monitoring server at the edge of the mobile network. By locating the monitoring server at the edge of the mobile network, the monitoring server can collect and estimate radio network state. Each of the servers exposes their interfaces via a known application program interface (API). The aggregated information from these systems can then be passed over to a core system which can analyze the information, and invoke appropriate optimizations of the network.

Figure 1:
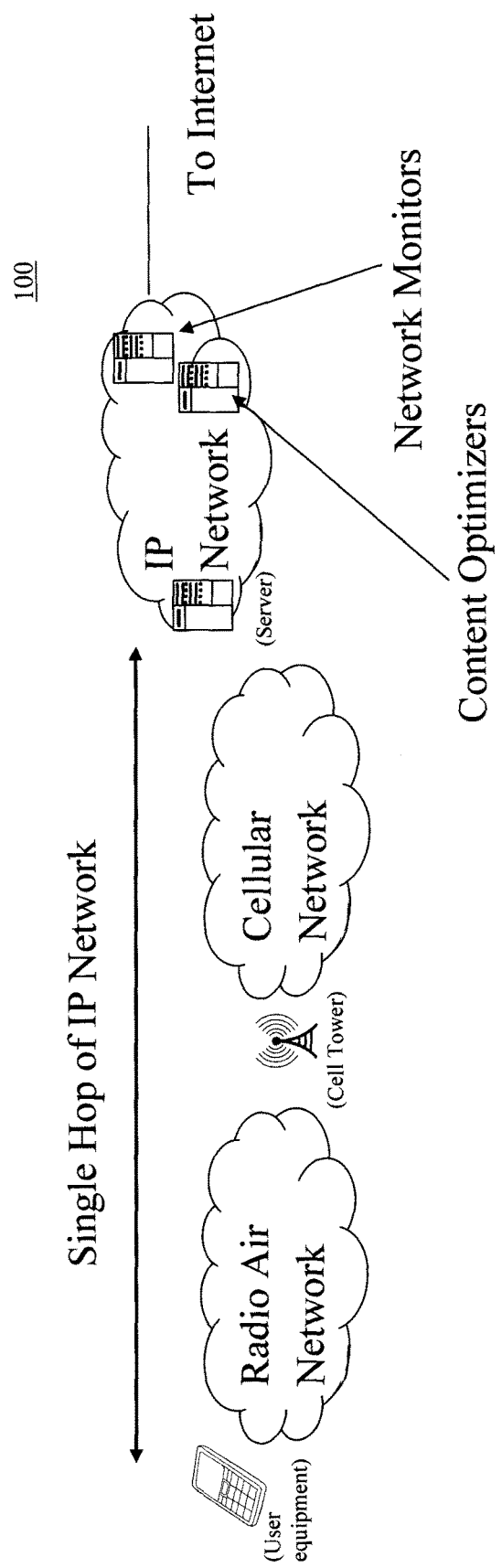
FIG. 1 is a diagram illustrating an exemplary mobile network according to an embodiment of the present invention.

FIG. 1 is a diagram illustrating an exemplary mobile network 100 which provides the framework for the present techniques. As shown in FIG. 1, the mobile network 100 (which may be operated by a large network operator) consists of three segments: a radio air network (or also simply a radio network), a cellular network, and an internet protocol (IP) network. The radio network connects user equipment (e.g., mobile telephones, personal digital assistants (PDAs), personal computers (PCs), laptop computers, etc.) to one or more cell towers. Each of the cell towers typically contain a base station that transmits data (obtained wirelessly from the user equipment) to the core network.

The cellular network connects the base stations to the IP network. The radio network and the cellular network are at the edge of mobile network 100, while the IP network is at the core of mobile network 100.

The IP network includes one or more servers which can be configured to monitor the network, optimize content, etc. As shown in FIG. 1, data traffic from the IP network is directed towards public data networks like the Internet.

Generally, the cellular network is invisible to the operator of the IP network. Namely, as shown in FIG. 1, the cellular network typically appears only as the last hop of a layer 2 link (i.e., the Data Link layer) from the user equipment to the IP network. As a result, any information about the cellular network or the radio air network is not exposed to the IP network. As highlighted above, the problem with this scenario is that the radio network tends to be the most congested network in current environments (such as mobile network 100), and therefore any attempts to optimize mobile network 100 without information about the edge capacity of the network are at best speculative and wholly incomplete.

For instance, in current state of the art networks, content optimizers (e.g., audio/video transcoding service—analog-to-analog or digital-to-digital conversion) are typically all located at the core of the network. See, for example, FIG. 1 wherein an exemplary content optimizer server is shown located in the IP network at the core of mobile network 100. If the content optimizers are all located in the core network, then the content optimizers are not able to properly adapt to the situations on the cellular network (including the state at the network edge).

The impact of changes in the cellular network may manifest itself in different ways in the IP network. Further, other network optimization functions (such as putting in rate controls, prioritization of traffic, etc.) that occur in the core network are typically all done independently of the conditions in the cellular network. Therefore, operating a mobile network where one is unaware of the respective conditions at the edge or at the core results in an inefficient operation of the network.

Advantageously, according to the present techniques, information is collected from the mobile network 100 in a manner that enables the core network to optimize its behavior based on the overall situation on the mobile network, including the edge capacity of the radio networks. Thus better informed optimizations of the network can be implemented, in real-time, in accordance with the current network state.

According to an exemplary embodiment, the present techniques are implemented using an application server(s) (also referred to herein as monitoring servers) at a select location(s) in the mobile network outside of the core network, which run applications that collects information about the cellular network. By way of example only, an application server can be located at one or more of the cell towers (see FIG. 1 and below) and can serve to collect information about the activity at the edge of the network. A network monitor (i.e., a server(s) in the core network—see, for example, the network monitor server in the IP network in FIG. 1) can receive this information from the edge of the network. The network state information collected from one or more sources at the edge can be aggregated and then used, e.g., by a network optimizer (i.e., a server(s) in the core network—see, for example, the network content optimizer server in the IP network in FIG. 1), along with information collected at the core, to optimize the mobile network. Alternatively and/or in addition to being present in the cell towers, application servers might be located in mobile switching centers (which contain concentration points where multiple cell towers connect), in a cell-on-wheel (which is like a portable cell tower), and/or the Radio Network Controller (which is a location used for coordinating different cell towers equipment—see below).

Generally, the present information-gathering applications are software applications that are run on the application servers at select locations in the mobile network to gather network information from one or more network monitoring sources. By way of example only, mobile network monitoring sources known in the art can include, but are not limited to, wireless monitoring devices (such as autonomous probes), network data monitoring devices (such as network monitors, network analyzers, sniffers), etc. See, for example, U.S. Patent Application Publication Number 2006/0270400 by Dasilva et al., entitled "Methods and Structure for Improved Monitoring and Troubleshooting in Wireless Communication Systems," (hereinafter "U.S. Patent Application Publication Number 2006/0270400"), the contents of which are incorporated by reference as if fully set forth herein. As described in U.S. Patent Application Publication Number 2006/0270400, an autonomous probe includes a wireless device(s) and a test box. The probe can be transported to the cell towers to evaluate the quality and performance of radio frequency (RF) communication with each cell tower. Network data monitoring means, such as sniffers, function by intercepting and logging data packets passing through a network, and can analyze the content of the data packets. Thus, there are a variety of means known in the art for collecting information at different locations throughout a network. The present techniques provide an effective mechanism to leverage this information in making network optimization decisions.

The information-gathering application can be configured to collect network information from the variety of available sources (as described above). A suitable application-based data collection process is described, for example, in U.S. Pat. No. 8,935,368 issued to Calo et al., entitled "Data Collection From Networked Devices," the contents of which are incorporated by reference as if fully set forth herein.

According to an exemplary embodiment, this information collected about the network is exposed as an Application Programming Interface (API) that is made available to the network monitor in the core network. See, for example, FIG. 2. APIs provide a convenient manner by which various applications can share information with one another. A general description of APIs is provided, for example, in U.S. Pat. No. 7,478,407 issued to Jain et al., entitled "Supporting Multiple Application Program Interfaces," (hereinafter "U.S. Pat. No. 7,478,407"), the contents of which are incorporated by reference as if fully set forth herein. For instance, as provided in U.S. Pat. No. 7,478,407 APIs define how communications will be exchanged between different systems. For example, the APIs can specify the format, fields, and protocols to employ when passing information between different systems.

Figure 2:
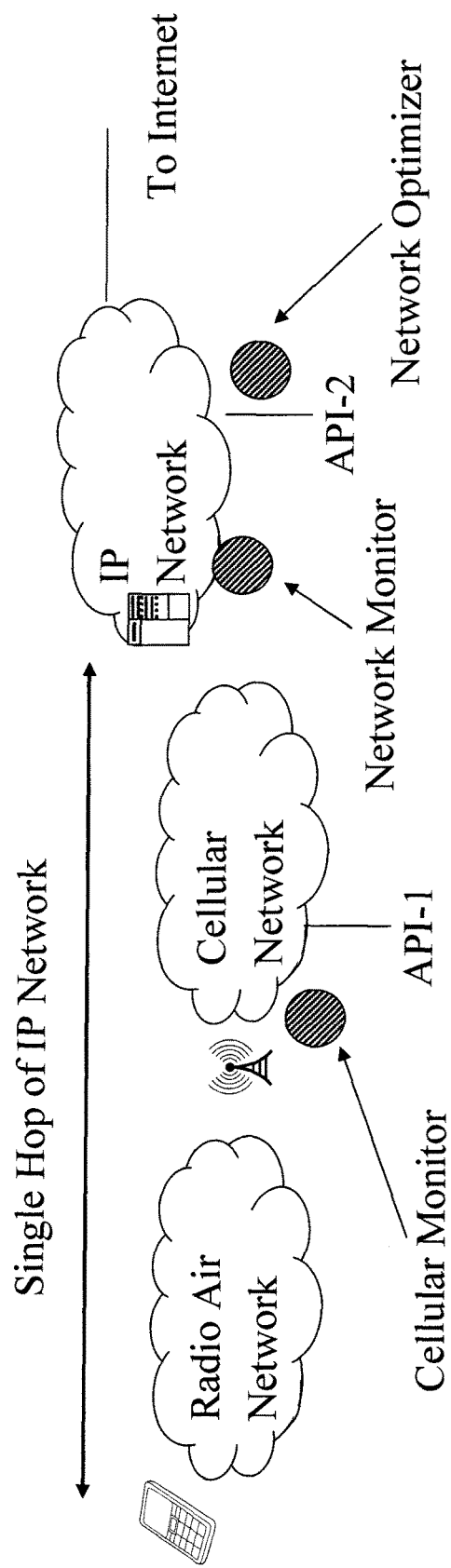
FIG. 2 is a diagram illustrating various Application Programming Interfaces (APIs) being implemented in the mobile network of FIG. 1 according to an embodiment of the present invention.

Namely, as shown in FIG. 2, various APIs (API-1, API-2, etc.) as according to the present exemplary embodiment are shown implemented in the mobile network of FIG. 1. API-1 and API-2 refer to different interfaces of cellular monitoring and data collection. For instance, as shown in FIG. 2, information about the cellular network can be collected from the information-gathering application (see above) via a first set of standardized APIs (e.g., API-1). The information is then sent to the monitoring component which may reside in the core network. The core network then can use another set of standardized APIs (e.g., API-2) to check on any applicable policy controls to determine the right optimization action to take. Yet another set of standardized APIs (see, for example, FIG. 3—described below) may then be used to perform the desired action(s) in the core network.

Through this present monitoring system, the APIs can expose network information at varying levels of granularity. For instance, information can be collected using the above-described process at as fine a level as the radio air quality to a specific address(es). This would provide, for example, data regarding the radio air quality experienced by a specific one of the user equipment—to which standardized quality of service (QoS) metrics can be applied to ascertain a measure of the radio air quality. For instance, QoS may be measured based on the number of hand-over failures the users experience over a given time period.

As provided above, in a mobile network such as mobile network 100 each of the cell towers typically contains a base station that transmits data (obtained wirelessly from the user equipment) to the core network. The data from the base stations is often relayed to the core network through one or more network elements—such as radio network controllers (RNCs), serving general packet radio service (GPRS) support nodes (SGSN), gateway GPRS support nodes (GGSN), etc. See, for example, U.S. Patent Application Publication Number 2014/0045475 by Anthony Jr. et al., entitled "Techniques for Improving Cache Effectiveness of Caches with Low User Population," (hereinafter "U.S. Patent Application Publication Number 2014/0045475"), the contents of which are incorporated by reference as if fully set forth herein. Each of these network elements processes data between the user equipment and the core network. Thus, signaling load on these network elements changes with the level of network traffic. Simply put, signaling load is the amount of processing load for a network element that is being used for signal processing. According to an exemplary embodiment, information is collected using the above-described process about the signaling load on a given one or more elements in the mobile network. For instance, in an exemplary embodiment provided below information regarding the state of a node in the cell tower (such as base station) is collected. This information can be, for example, the signaling load at the base station.

Further, a mobile network, such as mobile network 100, is typically distributed over different geographical areas, often referred to as cells. Each cell is served by at least one cell tower. Information can be collected using the above-described process at as course a level as the radio air congestion in a given cell.

According to the present techniques, the network information can be provided and collected (as described above) in a monitored manner and/or in a predictive manner (for example where a future state of the network is predicted based on past measurements). For instance, collecting data in a monitored manner may involve collecting network state information at a regular, predetermined interval or intervals. By way of example only, network state information may be collected at an interval of from about 1 minute to about 5 minutes, and ranges therebetween. To use a simple, non-limiting example, the network state information is collected every 5 minutes from the network edge and from the network core, and used in making network optimization decisions. Further, it may be desirable to implement different time intervals for information collection depending, for example, on network activity. For instance, a shorter time interval for information collection/retrieval (e.g., from about 1 minute to about 5 minutes, and ranges therebetween) may be implemented during the hours of peak network traffic (e.g., during the day, during business hours, etc.) while a longer time interval (e.g., from about 15 minute to about 30 minutes, and ranges therebetween) may be implemented during the hours of less network traffic (e.g., at night, on weekends, etc.). Shorter time intervals during high traffic hours permit finer grained adjustments to the network to be made when network conditions are most dynamic, such as during high traffic times.

Predictive information can further enhance the performance of the present optimization techniques. Predictive information about the network state can be used to supplement the data collected in real-time (i.e., in a monitored manner) and/or can be used as an independent metric for network state. To use a simple, non-limiting example, network state predictions can be used to optimize the network ahead of anticipated high traffic conditions and/or to fine-tune the optimization decision process based on real-time data which has already been collected.

By way of example only, predictions on network state can be made based on the observed utilization metrics of the radio network. By observing how much the percentage utilization of a radio network is in the last several minutes, one can predict the expected percentage utilization of the network for the next ten seconds with a reasonable accuracy. Such a prediction can be affected by means of algorithms known in the art, e.g., forecasting techniques as described in U.S. Pat. No. 5,461,699, issued to Arbabi et al., entitled "Forecasting Using a Neural Network and a Statistical Forecast," the contents of which are incorporated by reference as if fully set forth herein.

As provided above, once the network state information is collected from the cellular network via the respective API(s), the information is sent to a monitoring component which may reside in the core network. The core network can then use another set of standardized APIs to check on any applicable policy controls to determine the right optimization (reconfiguration) action to take, and then use another set of APIs to perform the desired action.

The desired network reconfiguration action could be dependent on the nature of the network status. Network status could indicate that the network is heavily utilized or likely to be heavily utilized and may require a reconfiguration on which the traffic entering the network is controlled, e.g., by discarding or delaying some of the traffic. Network status could indicate that losses in the network are increasing which may require the use of an encoding scheme which is more robust to information loss. Such a desired network reconfiguration can include actions such as, but not limited to, (a) downgrading the quality of video or pictures sent to a specific user equipment(s); (b) imposing rate control limits on traffic flowing to a set of IP addresses, or to a single IP address; and/or (c) turning on multicast (sending IP packets to multiple recipients) in the network instead of unicast (sending IP packets to a single recipient)—or vice versa, etc. Other functions can be defined to optimize the network, e.g. rerouting network traffic along certain paths, or to take some parts of the network offline.

Figure 3:
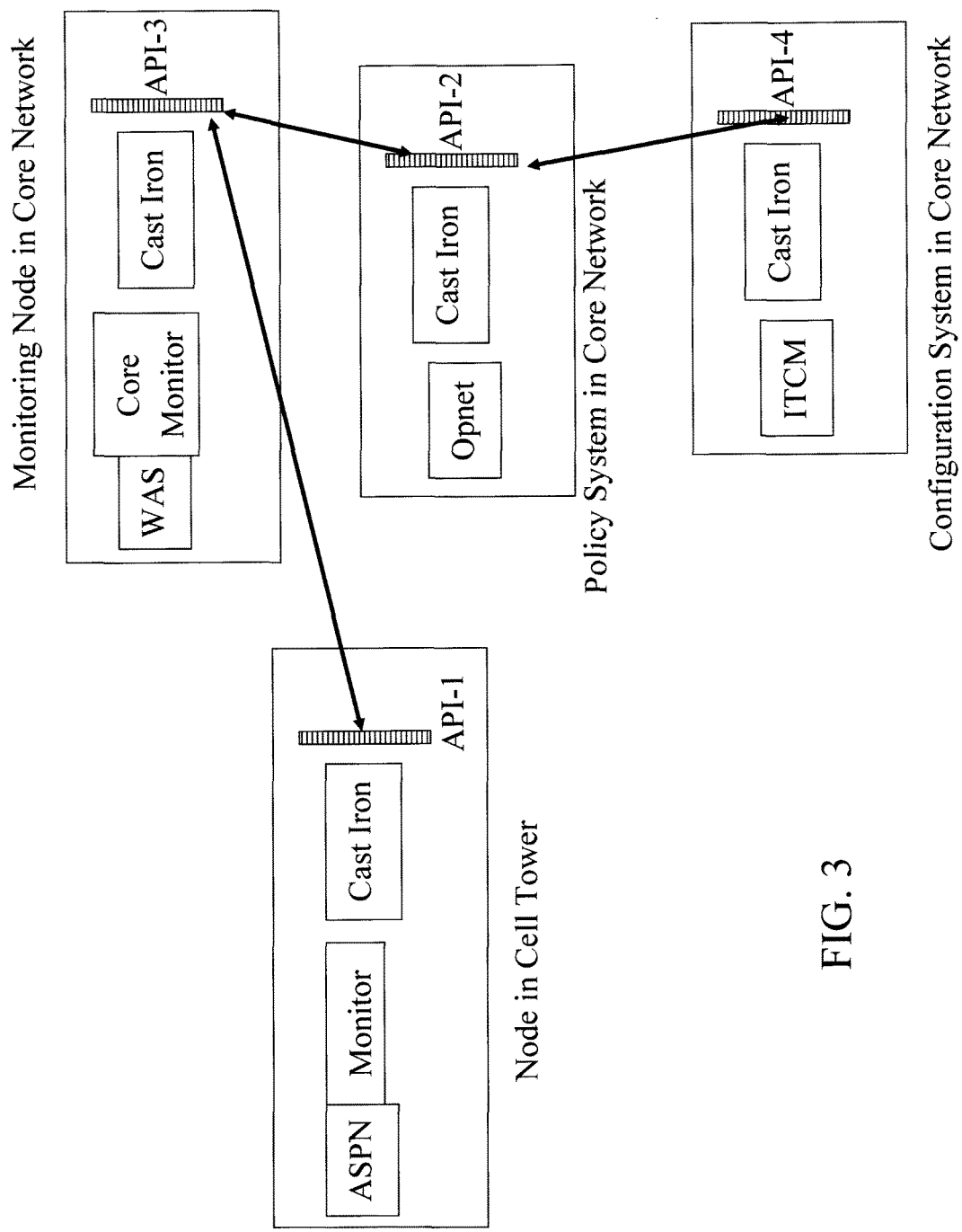
FIG. 3 is a diagram illustrating an exemplary implementation of the present techniques using commercially available software applications for collecting/monitoring, analyzing and implementing network state and optimization data according to an embodiment of the present invention.

An exemplary implementation of the present techniques is now described by way of reference to a system in FIG. 3 which makes use of commercially available software applications for collecting/monitoring, analyzing and implementing network state and optimization data. The system depicted in FIG. 3 may be deployed in a mobile network, such as mobile network 100 (described above)—having a radio air network and a cellular network at its edge and an IP network at its core. Information flow between the elements in the network is illustrated by double-sided arrows in FIG. 3. As shown in FIG. 3, network state information (from the network edge) passes from a node in a cell tower (such as a base station(s) located in the cell tower(s)) to a monitoring node in the core (such as a network monitor(s) in the IP network—see FIG. 1).

As provided above, the aggregated network state information (collected via the application server(s)) can then be transmitted to a monitoring server(s) in the core network. According to an exemplary embodiment, these application and monitoring servers expose their interfaces via known APIs. See for example API-1 and API-3 in FIG. 3. Based on the network state information received by the monitoring server(s), the network core can then consult applicable policy controls to determine the correct optimization action to take. According to an exemplary embodiment, the policy controls are present in a policy control (i.e., management) server in the core network—see for example "Policy System in Core Network" in FIG. 3. Again, (another) set of standardized APIs can be used to expose the interfaces of the monitoring and policy control servers. See for example API-3 and API-2 in FIG. 3. Finally, based on the applicable policy controls, suitable actions (see above) can be taken to optimize the core network. According to an exemplary embodiment, optimizations to the core network are carried out via a configuration server(s) in the core network—see for example "Configuration System in Core Network" in FIG. 3. Here as well, (another) set of standardized APIs can be used to expose the interfaces of the policy control and configuration servers. See for example API-2 and API-4 in FIG. 3.

In the example depicted in FIG. 3, the network state information is collected by means of a monitoring software application (labeled "Monitor") built on top of an Application Service Platform for Networks (labeled "ASPN") available from International Business Machines Corporation. By way of example only, the monitoring software could be a system which collects information from the network for analysis, e.g., an instance of IBM Tivoli NetCool Performance Manager. A detailed description of this product is provided in IBM Software Data Sheet "IBM Tivoli Netcool Performance Manager—Performance management for wireless, wireline and convergent networks," (June 2010), the contents of which are incorporated by reference as if fully set forth herein. As provided above, the application server(s) may be run at one or more of the base stations so as to collect network state information from the network edge. In such a case, Application Service Platform for Networks is an ideal computing platform for use as the application server since it can run applications directly within a mobile base station, and thus can deliver data directly from the base station. The Application Service Platform for Networks supports an API exported by means of the Cast Iron® application integration software (labeled "Cast Iron") available from International Business Machines Corporation.

In this example the monitoring server, which is located in the core network, consists of an IBM® WebSphere® Application Server (labeled "WAS") available from International Business Machines Corporation augmented with software for monitoring (labeled "Core Monitor"), and exposed using an API supported by Cast Iron®. As shown in FIG. 3, a policy control server (located in this example in the core network) running a modeling software application such as the Optimized Network Engineering Tools software available from OPNET Technologies, Inc. (which permits computer network modeling and simulation) (labeled "Opnet"), is used by the monitoring system to check on the action of the reconfiguration to be performed. This software tool supports an API exported by means of the Cast Iron® application integration software (labeled "Cast Iron"). The determination of the correct action to take can be done by means of policy driven actions, as an example using schemes described, e.g., in U.S. Pat. No. 7,397,770, issued to Le et al., entitled "Checking and Repairing a Network Configuration," the contents of which are incorporated by reference as if fully set forth herein.

Finally, based on the network state information gathered/collected by the network monitor(s), the network can be reconfigured with a goal being to optimize the network based on a present or predicted/future network state. In this example, reconfiguration of the network is carried out via a configuration server(s) which, in this case, is located in the core network. According to an exemplary embodiment, the configuration server(s) are running a configuration managing software application such as IBM® Tivoli® Netcool® Configuration Manager (labeled "ITCM") available from International Business Machines Corporation (which provides automated configuration capabilities for managing a network). Examples of some network reconfigurations that may be implemented in accordance with the present techniques were provided above.

Figure 4:
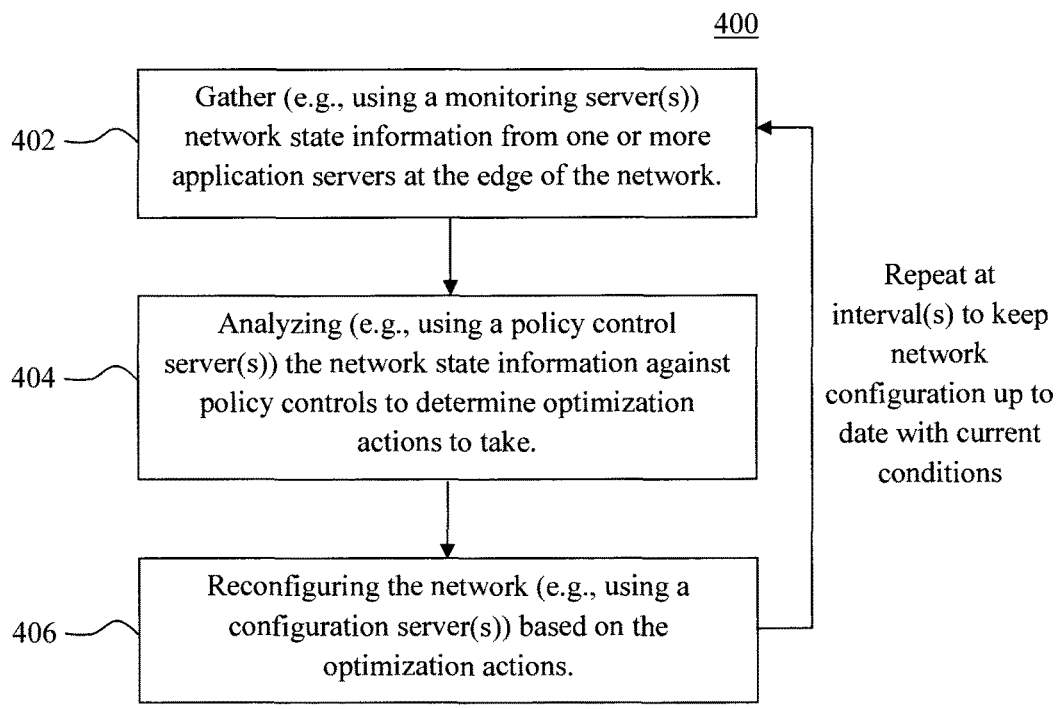
FIG. 4 is a diagram illustrating an exemplary methodology for managing a mobile network, such as the mobile network of FIG. 1, according to an embodiment of the present invention.

Given the above description of the present techniques, an exemplary methodology 400 for managing a mobile network (such as mobile network 100 of FIG. 1) is now described by way of reference to FIG. 4. Methodology 400 may be performed, for example, by the above-described monitoring server(s) which gather/collect the network state information, and/or policy control servers which analyze the information against policy controls, and/or configuration servers which implement network reconfigurations based on the information.

In step 402, network state information is gathered from one or more application servers located at the edge of the mobile network. As provided above, the edge of the mobile network can include a radio network and a cellular network through which user equipment communicate with an IP network which is at the network core. By way of example only, the application server(s) may be located at base stations in one or more cell towers in the cellular network. See, for example, FIGS. 2 and 3—described above.

According to an exemplary embodiment, the network state information is gathered in step 402 by a monitoring server(s). As provided above, this monitoring server(s) may be located in the core network. Preferably, the application and monitoring servers expose their interfaces via a standardized API during this information gathering step 402.

In step 404, the network state information gathered, e.g., by the monitoring server(s) in step 402, is then analyzed based on applicable policy controls to determine optimization actions to take. As provided above, this policy control analysis of the network state information can be carried out using a policy control server(s) which may also be part of the core network. Preferably, during transmission of the network state information from the monitoring server(s) to the policy control server(s) these servers expose their interfaces via another set of standardized APIs.

In step 406, the optimization actions determined in step 402 are implemented to reconfigure the mobile network. As provided above, network reconfigurations can be carried out using a configuration server which receives the optimization decisions from the policy control server(s). The configuration server may also be part of the core network. Preferably, the policy control and configuration servers expose their interfaces via another set of standardized APIs. Further, as shown in FIG. 4 and as described above, the process is preferably repeated in one or more predetermined intervals in order to keep network optimized for the current network state.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
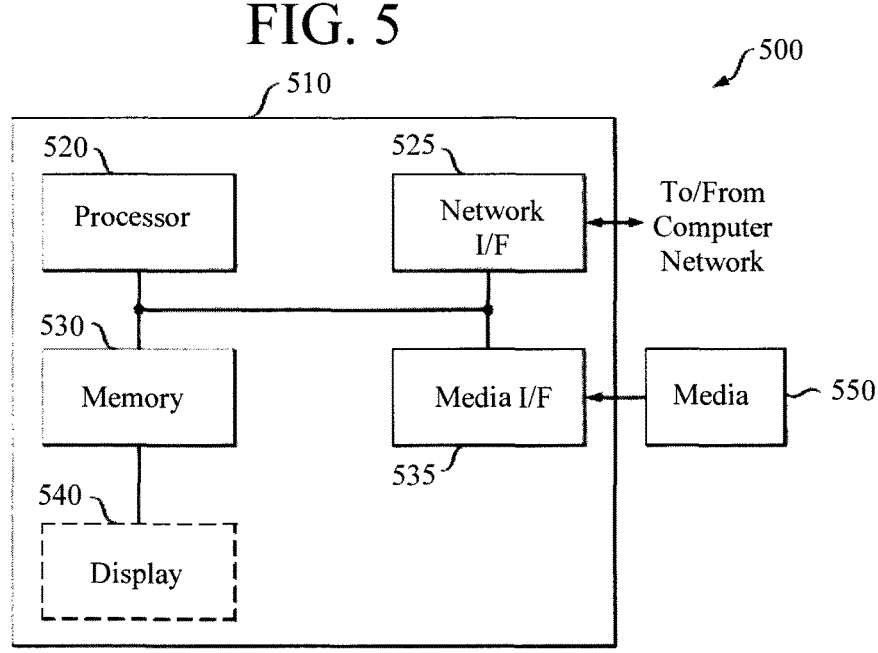
FIG. 5 is a diagram illustrating an exemplary apparatus for performing one or more of the methodologies presented herein according to an embodiment of the present invention.

Turning now to FIG. 5, a block diagram is shown of an apparatus 500 for implementing one or more of the methodologies presented herein. By way of example only, apparatus 500 is representative of one or more of the application, monitoring, policy control, and configuration servers described above, and thus can be configured to implement one or more of the steps of methodology 400 of FIG. 4.

Apparatus 500 includes a computer system 510 and removable media 550. Computer system 510 includes a processor device 520, a network interface 525, a memory 530, a media interface 535 and an optional display 540. Network interface 525 allows computer system 510 to connect to a network, while media interface 535 allows computer system 510 to interact with media, such as a hard drive or removable media 550.

Processor device 520 can be configured to implement the methods, steps, and functions disclosed herein. The memory 530 could be distributed or local and the processor device 520 could be distributed or singular. The memory 530 could be implemented as an electrical, magnetic or optical memory, or any combination of these or other types of storage devices. Moreover, the term "memory" should be construed broadly enough to encompass any information able to be read from, or written to, an address in the addressable space accessed by processor device 520. With this definition, information on a network, accessible through network interface 525, is still within memory 530 because the processor device 520 can retrieve the information from the network. It should be noted that each distributed processor that makes up processor device 520 generally contains its own addressable memory space. It should also be noted that some or all of computer system 510 can be incorporated into an application-specific or general-use integrated circuit.

Optional display 540 is any type of display suitable for interacting with a human user of apparatus 500. Generally, display 540 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for managing a mobile network, the method comprising the steps of:
    gathering network state information from an edge of the mobile network from one or more application servers located at the edge of the mobile network using applications running at the application servers that are configured to collect the network state information from the edge of the mobile network, wherein the edge of the mobile network includes a radio network and a cellular network through which user equipment communicate with an internet protocol (IP) network which is at a core of the mobile network;
    gathering the network state information from the edge of the mobile network at different predetermined time intervals whereby at least one first predetermined time interval is implemented during hours when a first level of network traffic is present and at least one second predetermined time interval is implemented during hours when a second level of network traffic is present, wherein the first level of network traffic is greater than the second level of network traffic, and wherein the at least one first predetermined time interval is shorter than the at least one second predetermined time interval;
    using the network state information gathered from the edge of the mobile network to make predictions of network utilization at one or more future time points;
    analyzing the network state information and the predictions based on policy controls to determine actions for optimizing the mobile network; and
    reconfiguring the mobile network using the actions for optimizing the mobile network,
    wherein the mobile network is distributed over multiple cells covering different geographical areas, wherein each cell is served by at least one cell tower having base stations through which the user equipment transmit data to the core of the mobile network, and wherein the network state information is gathered from the edge of the mobile network at multiple levels of granularity which comprises gathering: I) radio air quality data from individual user equipment, II) signaling load data from one or more of the base stations, and III) radio air congestion data for one or more of the cells.

2. The method of claim 1, wherein the application servers are located in the at least one cell tower.

3. The method of claim 1, wherein the network state information is gathered by one or more monitoring servers.

4. The method of claim 3, wherein the monitoring servers are located in the core of the mobile network.

5. The method of claim 3, wherein interfaces of the application servers and the monitoring servers are exposed via a set of application programming interfaces (APIs) during the gathering step.

6. The method of claim 1, wherein the network state information is analyzed by one or more policy control servers.

7. The method of claim 6, wherein the policy control servers are located in the core of the mobile network.

8. The method of claim 1, wherein the mobile network is reconfigured by one or more configuration servers.

9. The method of claim 8, wherein the configuration servers are located in the core of the mobile network.

10. The method of claim 1, wherein the network state information comprises information regarding one or more of: radio air quality, signaling load, and radio air congestion.

11. The method of claim 1, wherein the actions for optimizing the mobile network comprise one or more of: (a) downgrading a quality of video or pictures sent to one or more of the user equipment, (b) imposing rate control limits on traffic flowing to one or more IP addresses, and (c) turning on multicast in the mobile network instead of unicast.

12. The method of claim 1, further comprising the step of:
    reconfiguring the mobile network by turning on multicast whereby IP packets are sent to multiple recipients in the mobile network instead of to a single recipient.

13. A system for managing a mobile network, the system comprising:
    one or more monitoring servers for i) gathering network state information from one or more application servers located at an edge of the mobile network, the application servers running applications that are configured to collect the network state information from the cellular network, and ii) using the network state information gathered from the edge of the mobile network to make predictions of network utilization at one or more future time points, wherein the edge of the mobile network includes a radio network and a cellular network through which user equipment communicate with an IP network which is at a core of the mobile network, wherein the monitoring servers are configured to gather the network state information from the application servers at different predetermined time intervals whereby at least one first predetermined time interval is implemented during hours when a first level of network traffic is present and at least one second predetermined time interval is implemented during hours when a second level of network traffic is present, wherein the first level of network traffic is greater than the second level of network traffic, and wherein the at least one first predetermined time interval is shorter than the at least one second predetermined time interval;

one or more policy control servers for analyzing the network state information and the predictions based on policy controls to determine actions for optimizing the mobile network; and one or more configuration servers for reconfiguring the mobile network using the actions for optimizing the mobile network, wherein the mobile network is distributed over multiple cells covering different geographical areas, wherein each cell is served by at least one cell tower having base stations through which the user equipment transmit data to the core of the mobile network, and wherein the one or more monitoring servers gather the network state information from the edge of the mobile network at multiple levels of granularity which comprises gathering: I) radio air quality data from individual user equipment, II) signaling load data from one or more of the base stations, and III) radio air congestion data for one or more of the cells.

14. The system of claim 13, wherein the one or more application servers are located in the at least one cell tower.

15. The system of claim 13, wherein the monitoring servers, the policy control servers, and the configuration servers are located in the core of the mobile network.

16. The system of claim 13, wherein interfaces of the application servers and the monitoring servers are exposed via a set of APIs.

17. The system of claim 13, wherein interfaces of the monitoring servers and the policy control servers are exposed via a set of APIs.

18. The system of claim 13, wherein interfaces of the policy control servers and the configuration servers are exposed via a set of APIs.

19. A computer program product for managing a mobile network, the computer program product comprising a computer readable storage medium having program instructions embodied therewith, the program instructions executable by a computer to cause the computer to:

gather network state information from an edge of the mobile network from one or more application servers located at the edge of the mobile network using applications running at the application servers that are configured to collect the network state information from the edge of the mobile network, wherein the edge of the mobile network includes a radio network and a cellular network through which user equipment communicate with an internet protocol (IP) network which is at a core of the mobile network;

gather the network state information from the edge of the mobile network at different predetermined time intervals whereby at least one first predetermined time interval is implemented during hours when a first level of network traffic is present and at least one second predetermined time interval is implemented during hours when a second level of network traffic is present, wherein the first level of network traffic is greater than the second level of network traffic, and wherein the at least one first predetermined time interval is shorter than the at least one second predetermined time interval;

use the network state information gathered from the edge of the mobile network to make predictions of network utilization at one or more future time points;

analyze the network state information and the predictions based on policy controls to determine actions for optimizing the mobile network; and reconfigure the mobile network using the actions for optimizing the mobile network, wherein the mobile network is distributed over multiple cells covering different geographical areas, wherein each cell is served by at least one cell tower having base stations through which the user equipment transmit data to the core of the mobile network, and wherein the network state information is gathered from the edge of the mobile network at multiple levels of granularity which comprises gathering: I) radio air quality data from individual user equipment, II) signaling load data from one or more of the base stations, and III) radio air congestion data for one or more of the cells.

* * * * *